(12) United States Patent
Zhuang et al.

(10) Patent No.: US 11,025,984 B2
(45) Date of Patent: Jun. 1, 2021

(54) METHOD, SYSTEM FOR PROCESSING A LIVE-BROADCASTING DATA, AND SERVER THEREOF

(71) Applicant: Wangsu Science & Technology Co., Ltd., Shanghai (CN)

(72) Inventors: Xiaochuan Zhuang, Shanghai (CN); Fengqing Lian, Shanghai (CN); Junming Li, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/442,039

(22) Filed: Jun. 14, 2019

(65) Prior Publication Data

US 2020/0245020 A1 Jul. 30, 2020

Related U.S. Application Data

(63) Continuation of application No. PCT/CN2019/077232, filed on Mar. 6, 2019.

(30) Foreign Application Priority Data

Jan. 30, 2019 (CN) .......................... 201910094150.6

(51) Int. Cl.
*H04N 21/43* (2011.01)
*H04N 21/433* (2011.01)
(Continued)

(52) U.S. Cl.
CPC ..... *H04N 21/4334* (2013.01); *H04N 21/2187* (2013.01); *H04N 21/2387* (2013.01);
(Continued)

(58) Field of Classification Search
CPC ........ H04L 29/08702; H04L 29/08801; H04N 21/2183; H04N 21/23113; H04N 21/2187; H04N 21/231
See application file for complete search history.

(56) References Cited

U.S. PATENT DOCUMENTS

| | | | | |
|---|---|---|---|---|
| 2001/0047516 | A1* | 11/2001 | Swain .............. | H04N 21/64322 725/86 |
| 2002/0188943 | A1* | 12/2002 | Freeman .......... | H04N 21/63345 725/38 |

(Continued)

FOREIGN PATENT DOCUMENTS

| | | |
|---|---|---|
| CN | 101409659 A | 4/2009 |
| CN | 102281474 B | 3/2013 |

(Continued)

OTHER PUBLICATIONS

International Search Report and Written Opinion dated Oct. 21, 2019, Patent Application No. PCT/CN2019/077232, 9 pages.

(Continued)

*Primary Examiner* — Jefferey F Harold
*Assistant Examiner* — Timothy R Newlin
(74) *Attorney, Agent, or Firm* — Davis Wright Tremaine LLP

(57) ABSTRACT

Embodiments of the present disclosure provide a method and system for processing live-broadcasting data, and a server thereof. The method includes: acquiring live-broadcasting streaming data of streaming media; receiving recording information corresponding to the live-broadcasting streaming data, wherein the recording information includes a recording type and a recording parameter; recording the live-broadcasting streaming data based on the recording information to obtain a recorded file; and generating storage information for the recorded file based on the recording information. The present disclosure can diversify the live- (Continued)

broadcasting streaming media data to accommodate the demands from different users on replaying or auditing the live-broadcasting content. In this way, user experience is improved.

16 Claims, 4 Drawing Sheets

(51) Int. Cl.
*H04N 21/2187* (2011.01)
*H04N 21/845* (2011.01)
*H04N 21/647* (2011.01)
*H04N 21/2387* (2011.01)
*H04N 21/231* (2011.01)

(52) U.S. Cl.
CPC . *H04N 21/23109* (2013.01); *H04N 21/64784* (2013.01); *H04N 21/8456* (2013.01)

(56) References Cited

U.S. PATENT DOCUMENTS

| | | | | |
|---|---|---|---|---|
| 2003/0067554 | A1* | 4/2003 | Klarfeld | H04N 21/26283 348/461 |
| 2004/0025181 | A1* | 2/2004 | Addington | H04N 21/2225 725/58 |
| 2005/0044084 | A1* | 2/2005 | Huang | G11B 27/329 |
| 2005/0289617 | A1 | 12/2005 | Safadi et al. | |
| 2008/0281977 | A1* | 11/2008 | Branam | H04N 21/4223 709/231 |
| 2014/0270717 | A1 | 9/2014 | Chen et al. | |
| 2016/0249086 | A1 | 8/2016 | Pan et al. | |
| 2016/0255419 | A1 | 9/2016 | Feng | |
| 2017/0085801 | A1 | 3/2017 | Matas et al. | |

FOREIGN PATENT DOCUMENTS

| | | |
|---|---|---|
| CN | 103517157 A | 1/2014 |
| CN | 103546766 A | 1/2014 |
| CN | 105306974 A | 2/2016 |
| CN | 105721811 A | 6/2016 |
| CN | 106162231 A | 11/2016 |
| CN | 106954081 A | 7/2017 |
| CN | 107580235 A | 1/2018 |
| CN | 107659825 A | 2/2018 |
| CN | 107666613 A | 2/2018 |
| CN | 108540854 A | 9/2018 |
| CN | 109089127 A | 12/2018 |
| CN | 109151502 A | 1/2019 |
| EP | 3471421 A1 | 4/2019 |
| WO | 0182598 A2 | 11/2001 |

OTHER PUBLICATIONS

European Extended Search Report dated May 12, 2020, Patent Application No. 19725835.3, 17 pages.
Chinese First Office Action dated Dec. 9, 2019, Patent Application No. 201910094150.6, 9 pages.
Chinese Second Office Action dated Jun. 22, 2020, Patent Application No. 201910094150.6, 11 pages.

* cited by examiner

METHOD, SYSTEM FOR PROCESSING A LIVE-BROADCASTING DATA, AND SERVER THEREOF

CROSS-REFERENCE TO RELATED DISCLOSURE

The present application is a continuation of International Application No. PCT/CN2019/077232, filed on Mar. 6, 2019, which claims benefit of Chinese Application No. 201910094150.6 filed Jan. 30, 2019, the contents of which are incorporated herein by reference in their entirety.

TECHNICAL FIELD

The present disclosure relates to the technical field of Internet, and in particular, relates to a method, system for processing a live-broadcasting data and server thereof.

BACKGROUND

With rapid development of the Internet, Internet live-broadcasting platforms and mobile phone live-broadcasting Apps are prevailing and the network live-broadcasting technologies are being constantly improved.

At present, in order to reduce live-broadcasting delay and improve live-broadcasting fluency, the live-broadcasting platform basically adopts the content delivery network (CDN) technology to realize the distribution of steam data in the Internet live-broadcasting. The existing CDN provider generally provides only a single live-broadcasting distribution service. Therefore, real-time live-broadcasting services are only provided in live-broadcasting content, and the live-broadcasting content may not be replayed, audited or the like. With respect to storage of the live-broadcasting data, the method is usually to directly store and upload the received streaming media data to a user source station.

The inventors have found that the existing technology has at least the following problems: Since users can only watch the live-broadcasting content in real time, and cannot play back the live-broadcasting content, which may result in a single user experience and reduce the user's adhesion. Further, the live-broadcasting data may not be audited, and thus illegal live-broadcasting content may be played. Therefore, a method for processing live-broadcasting data which supports replay of the live-broadcasting data by different users is urgently desired.

SUMMARY

Some embodiments of the present disclosure are intended to provide a method, system for processing a live-broadcasting data, and server thereof, which can diversify live-broadcasting streaming media data to accommodate the demands from different users on replaying or auditing the live-broadcasting content, thereby improving the user experience.

In an embodiment of the present disclosure, it is provided a method for processing live-broadcasting data. The method includes: acquiring live-broadcasting streaming data of streaming media; receiving recording information corresponding to the live-broadcasting streaming data, where the recording information includes: a recording type and a recording parameter; recording the live-broadcasting streaming data based on the recording information; and generating storage information for recorded file based on the recording information.

In an embodiment of the present disclosure, it is further provided a system for processing live-broadcasting data. The system includes: a distribution node, configured to acquire live-broadcasting streaming data of streaming media, and receive recording information corresponding to the live-broadcasting streaming data, where the recording information includes: a recording type and a recording parameter; a recording node, configured to record the live-broadcasting streaming data based on the recording information; and a storage node, configured to generate storage information for a recorded file based on the recording information, where the storage information includes a URL and/or a broadcast prohibit command.

In an embodiment of the present disclosure, it is further provided a server. The server includes a memory and a processor. The memory is configured to store a computer program, and when the computer program is executed by the processor, the method for implementing the foregoing is performed.

Compared with the existing technology, the technical solutions provided by the present disclosure can perform different data processing on the live-broadcasting data streams based on different recording types and recording parameters. The recording types may include: on-demand, replay, highlight collection and content auditing. Therefore, by processing the live-broadcasting data streams based on different recording types, video files or picture files having a predefined time duration are generated for user to on-demand replay, highlight segments during the live-broadcasting may also be intercepted to generate a highlight collection for user to watch, and further whether live-broadcasting content is legal or not may be audited. In this way, different demands from different users on replaying the live-broadcasting content can be satisfied. Therefore, the technical solutions provided by the present disclosure can diversify the live-broadcasting streaming media data to accommodate the demands from different users on replaying or auditing the live-broadcasting content, thereby improving the user experience.

BRIEF DESCRIPTION OF THE DRAWINGS

For clearer description of the technical solutions according to the embodiments of the present disclosure, drawings used in the description of the embodiments will be briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

In order to make the objectives, technical solutions and advantages of the present disclosure clearer, some embodiments of the present disclosure are further described in detail below by reference to exemplary embodiments and the accompanying drawings. It should be understood that the specific embodiments described herein are only intended to explain the present disclosure instead of limiting the present disclosure.

Figure 1:
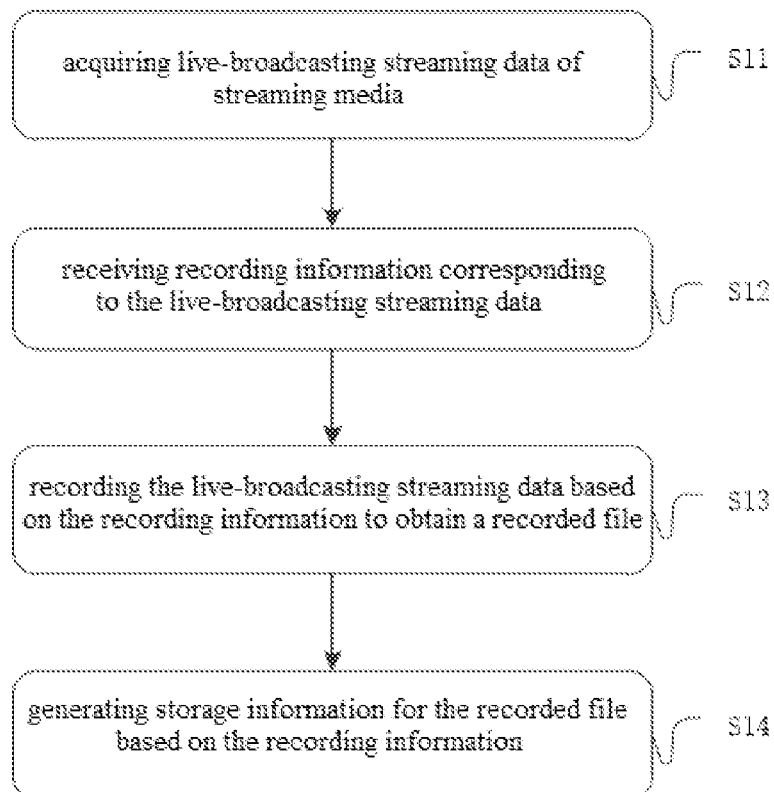
FIG. 1 is a flowchart of a method for processing live-broadcasting data according to an embodiment of the present disclosure.

The present disclosure provides a method for processing live-broadcasting data. The method can be applied to recording, storage and replay of the live-broadcasting data. Referring to FIG. 1, the method for processing live-broadcasting data can be applied to processing of live-broadcasting streaming media data. The method for processing live-broadcasting data can also be applied to a CDN-based live-broadcasting processing system. A live-broadcasting processing system for performing the method for processing live-broadcasting data may include: a distribution node, a recording node and a storage node. The distribution node, the recording node and the storage node may be a server or a server cluster.

Referring to FIG. 1, the method for processing live-broadcasting data of the present disclosure may include the following steps:

S11: acquiring live-broadcasting streaming data of streaming media.

A live-broadcasting processing system may acquire the live-broadcasting streaming data of the streaming media. The live-broadcasting streaming data of the streaming media may be acquired by a distribution node in the live-broadcasting processing system.

The live-broadcasting streaming data of the streaming media may include: audio data and/or video data.

S12: receiving recording information corresponding to the live-broadcasting streaming data.

The recording information may include: recording type and recording parameter.

The recording information may be received by the distribution node.

In an embodiment of the present disclosure, the recording information may be pre-configured locally, or may be sent from a user interface.

In an embodiment of the present disclosure, the recording type may be used to indicate purpose of recording the live-broadcasting streaming data. Specifically, the recording type may include at least one of the following: content auditing, record replay and highlight collection. Specifically, when the recording type includes content auditing, the recorded live-broadcasting streaming data may be used to audit whether live-broadcasting content is illegal; and when the recording type includes record replay, the recorded live-broadcasting streaming data may be used to provide a live-broadcasting content replay service; and when the recording type includes highlight collection, the recorded live-broadcasting streaming data may be used to provide a highlight episode in the live-broadcasting.

In an embodiment of the present disclosure, the recording parameter may include at least one of the following: a live-broadcasting streaming data address, a report center information, a storage information, a container format, a coding format, a resolution and a segmentation interval duration.

The report center information may include: a reporting center address, that is, the address of a reporting center. The reporting center may be a server. The reporting center may generate storage information for the recorded file based on the recording type. Specifically, the reporting center may generate a URL corresponding to the recorded file, or may send a broadcast prohibit command when an auditing result indicates that the live-broadcasting content is illegal.

The storage information may include: a storage address. The storage address may be used to store the address of the recorded file.

The container format is a format of encapsulating the recorded live-broadcasting data, and may be one or more of the following: FLASH VIDEO (FLV), Transport Stream (TS), HTTP Live Streaming (HLS), Moving Picture Experts Group 4 (MP 4), Joint Photographic Experts Group (JPG), Graphics Interchange Format (GIF) and the like.

The coding format may be a coding format employed for recording the live-broadcasting data. The coding format may include: a video coding format, a picture coding format and/or an audio coding format. For example, the video coding format may include: Moving Pictures Experts Group (MPEG 4) coding, H.263 coding, H.264 coding, High Efficiency Video Coding (HEVC), VP8 coding, VP9 coding, AVC coding and the like. The picture coding format may include: JPEG coding, PNG coding, BMP coding and GIF coding. The audio coding format may include: Pulse Code Modulation (PCM) coding, Windows Media Audio (WMA) coding, linear predictive coding (LPC) coding, Moving Picture Experts Group Audio Layer 3 (MP3) coding and the like.

The resolution may be used to represent effective pixels in the lateral and longitudinal directions when the recorded live broadcast streaming data is played. The resolution may be represented by 1080P, 720P or the like. For example, 1080P may indicate that in progressive scanning, there are 1080 horizontal scanning lines in the longitudinal direction, that is, 1080 effective pixels in the longitudinal direction; and usually a 1080P has a screen resolution of 1920×1080.

The segmentation interval duration may indicate a duration when the recorded file is played. For example, the segmentation interval duration may be 1 hour, 5 seconds or the like.

The recording parameter may be used to configure the recording node, such that the recorded live-broadcasting streaming data is obtained. For example, when the recording parameter includes the container format as MP4, the recorded live-broadcasting streaming data will be encapsulated into an MP4 file.

In an embodiment of the present disclosure, the distribution node may send a recording request to the recording node in the live-broadcasting processing system, where the recording request includes the recording information.

S13: recording the live-broadcasting streaming data based on the recording information to obtain a recorded file.

In an embodiment of the present disclosure, the recording node in the live-broadcasting processing system may receive the recording request sent by the distribution node, and record the live-broadcasting streaming data based on the recording information in the recording request.

Figure 2:
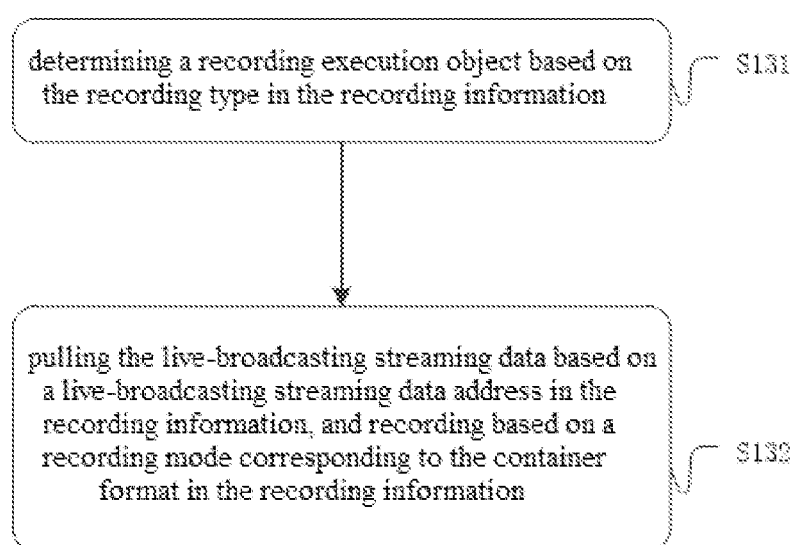
FIG. 2 is a flowchart of recording live-broadcasting data based on recording information according to an embodiment of the present disclosure.

In an embodiment of the present disclosure, referring to FIG. 2, the recording the live-broadcasting streaming data based on the recording information may include the following steps:

S131: determining a recording execution object based on the recording type in the recording information.

In an embodiment of the present disclosure, the recording node may select a recording execution object from at least one execution object. The execution object may be a server or a processor.

In an embodiment of the present disclosure, after the recording execution object is determined, a task identifier may also be generated. The task identifier is used to uniquely identify a recording task corresponding to the recording request.

Further, the recording node may also feedback the task identifier to the distribution node. When the live-broadcasting processing system is disconnected from the live-broadcasting stream, the distribution node may send a recording task end notification message to the recording node, where the recording task end notification message may include a task identifier. The recording node may terminate the recording task corresponding to the task identifier based on the task identifier.

In an embodiment of the present disclosure, the recording node may be further configured to monitor an operating state of the recording execution object. When the recording execution object stops operating, another recording execution object may be re-selected.

S132: pulling the live-broadcasting streaming data based on a live-broadcasting streaming data address in the recording information, and recording based on a recording mode corresponding to the container format in the recording information to obtain a recorded file.

In an embodiment of the present disclosure, the live-broadcasting streaming data may be pulled based on the live-broadcasting streaming data address in the recording information.

In an embodiment of the present disclosure, the container format and the recording mode may have a predefined corresponding relationship therebetween. The recording mode may include video file recording and picture recording.

In an embodiment of the present disclosure, when the container format in the recording information includes a video file format, the corresponding recording mode includes a video file recording; and when the container format in the recording information includes a picture file format, the corresponding recording mode includes a picture recording.

In an embodiment of the present disclosure, the recording based on the recording mode corresponding to the container format in the recording information may include: when the container format in the recording information includes a format of a video file, using video file recording as the recording mode, and recording segment by segment to generate an on-demand file based on the coding format and the segmentation interval duration in the recording information. The on-demand file may be generated by using a position of a key frame. The on-demand file may support a drag function. A file name of the on-demand file may include start time and end time of the recording. For example, the file name of an on-demand file may be "lol5_20180810010000_20180810015959", where 20180810010000 indicates that the start time of the recording is 01:00:00 on Aug. 10, 2018, 20180810015959 indicates that the end time of the recording is 01:59:59 on Aug. 10, 2018, and a duration of the on-demand file is 1 hour.

In an embodiment of the present disclosure, the recording based on the recording mode corresponding to the container format in the recording information may include: when the container format in the recording information includes the format of a picture file, using picture recording as the recording mode, and generating at least one picture file based on the coding format and the segmentation interval duration in the recording information.

By recording based on the recording mode corresponding to the container format, a recorded file complying with the container format may be obtained, which can be used for on-demand replay, highlight collection replay, content audit and the like. In this way, different requirements of users can be satisfied.

In an embodiment of the present disclosure, the recording node may send the recorded file and the corresponding recording information to the storage node in the live-broadcasting processing system.

S14: generating storage information for the recorded file based on the recording information.

In an embodiment of the present disclosure, the storage node in the live-broadcasting processing system may receive the recording information and the recorded file sent by the recording node, and generate the storage information for the recorded file based on the recording information.

In an embodiment of the present disclosure, the storage information may be generated for the recorded file based on a storage information generation mode corresponding to the recording type in the recording information. A predefined corresponding relationship may be established between the recording type and the storage information generation mode. The storage information may include: a URL and/or a broadcast prohibit command.

In an embodiment of the present disclosure, when the recording type includes on-demand replay, the storage information generation mode may include: generating a corresponding URL for a recorded on-demand file. For example, with respect to an on-demand file named "lol5_20180810010000_20180810015959", a corresponding URL thereof may be generated. The URL may direct to the on-demand file, and the URL may be "http://ip/wangsu.rec.com/live/lol5_20180810010000_20180810015959.flv". A user may on-demand replay the on-demand file by accessing the URL.

In an embodiment of the present disclosure, when the recording type includes highlight collection, the storage information generation mode may include: matching a video frame in the recorded file with a predefined image feature library, and intercepting video data having a predefined preamble duration and a subsequent duration in the video frame and generating a URL for the intercepted video data if the video frame successfully matches with the predefined image feature library. For example, when a video frame successfully matches with the predefined image feature library, video data within the first 10 seconds and within the last 5 seconds may be intercepted from the video frame, and a URL is generated for the intercepted video data. The user may replay a video segment of the highlight collection by accessing the URL.

When a plurality of video data are intercepted from a recorded file, the plurality of video data may be combined into one video data, and a corresponding URL is generated. The user may replay all of the playback of the multiple highlight collection by accessing the URL.

In the embodiment of the present disclosure, the video frame in the recorded file may be matched with the predefined image feature library based on a convolutional neural network.

In an embodiment of the present disclosure, when the recording type includes content auditing, the storage information generation mode may include: extracting a plurality of pictures corresponding to the recorded file, sequentially matching the plurality of pictures with a predefined content auditing feature library, and generating a broadcast prohibit command corresponding to the recorded file if a consecutive value of successful matching reaches a predefined threshold.

In the embodiment of the present disclosure, the plurality of pictures may be sequentially matched with the predefined content auditing feature library based on the convolutional neural network.

In an embodiment of the present disclosure, the method further includes: performing a broadcast prohibit operation for the recorded file based on the broadcast prohibit command. The broadcast prohibit command may include: broadcast prohibit time. The broadcast prohibit time may be a time period or permanent. The broadcast prohibit time may be pre-configured.

When the broadcast prohibit time is a time period, the performing a broadcast prohibit operation for the recorded file based on the broadcast prohibit command may be: prohibiting the broadcast of the recorded live-broadcasting streaming data within the time period. When the broadcast prohibit time is permanent, the performing a broadcast prohibit operation for the recorded file based on the broadcast prohibit command may be: permanently prohibiting the broadcast of the recorded live-broadcasting streaming data.

Figure 3:
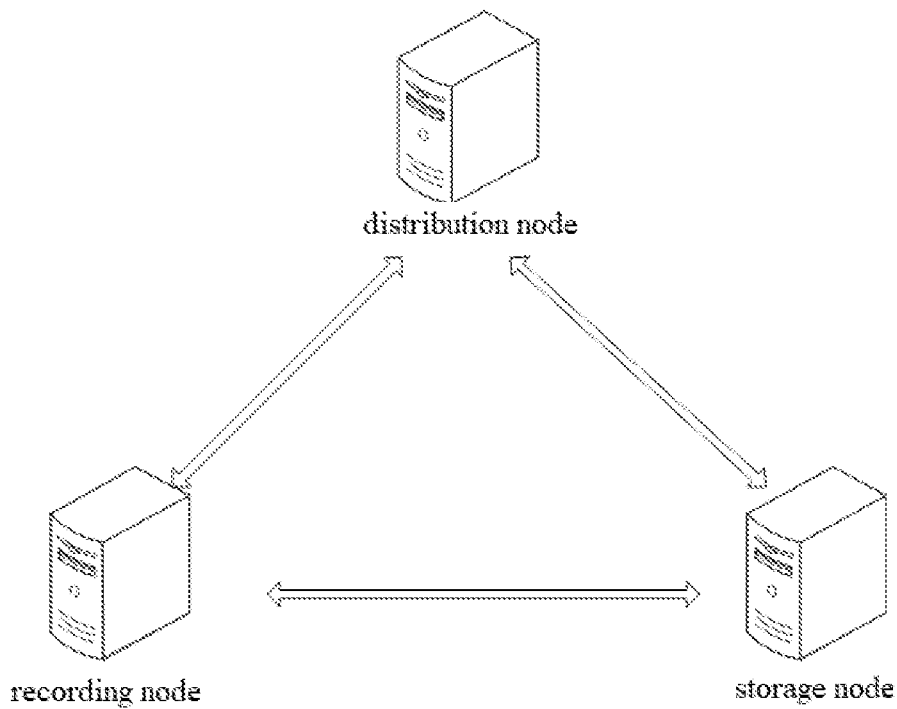
FIG. 3 is a schematic structural diagram of a system for processing live-broadcasting data according to an embodiment of the present disclosure.

In an embodiment of the present disclosure, it is further provides a system for processing live-broadcasting data. Referring to FIG. 3, the system for processing live-broadcasting data may include: a distribution node, a recording node and a storage node.

The distribution node may be configured to acquire live-broadcasting streaming data of streaming media and receive recording information corresponding to the live-broadcasting streaming data. The recording information may include: a recording type and a recording parameter.

The recording type may include at least one of the following: content auditing, recording replay and highlight collection.

The recording parameter may include at least one of the following: a live-broadcasting streaming data address, a report center information, a storage information, a container format, a coding format, a resolution and a segment interval duration.

The recording node may be configured to record the live-broadcasting streaming data based on the recording information.

In an embodiment of the present disclosure, the recording node may be further configured to generate a task identifier which uniquely identifies a recording task, and feedback the task identifier to the distribution node. The recording task corresponds to a recording request sent by the distribution node. In an embodiment of the present disclosure, the distribution node may also send a recording task end notification message, where the recording task end notification message may include a task identifier.

The storage node may be configured to generate storage information for the recorded file based on the recording information.

In an embodiment of the present disclosure, when the storage information generated by the storage node includes a broadcast prohibit command, the storage node may be further configured to send the broadcast prohibit command to the distribution node. In this case, the distribution node may be further configured to receive the broadcast prohibit command sent by the storage node, and perform a broadcast prohibit operation based on the broadcast prohibit command.

Figure 4:
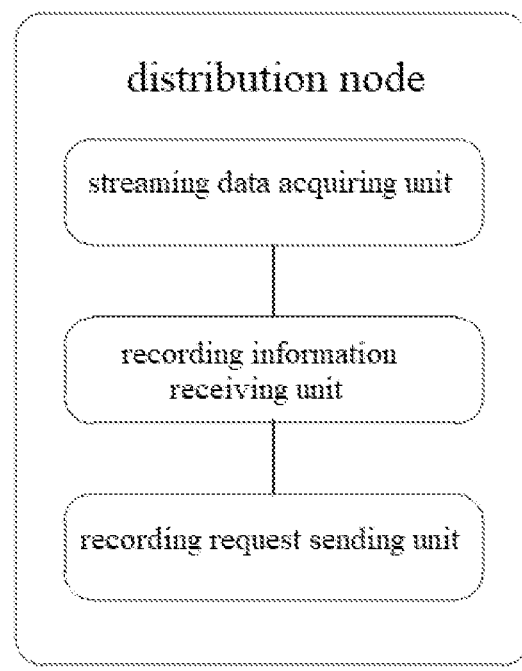
FIG. 4 is a module diagram of a distribution node in the system for processing live-broadcasting data according to an embodiment of the present disclosure.

Referring to FIG. 4, the distribution node may include: a streaming data acquiring unit, a recording information receiving unit and a recording request sending unit.

The streaming data acquiring unit may be configured to acquire the live-broadcasting streaming data of the streaming media.

The recording information receiving unit may be configured to receive the recording information corresponding to the live-broadcasting streaming data. The recording information may be pre-configured locally, or may be sent from a user interface.

The recording request sending unit may be configured to send a recording request to the recording node. The recording request includes the recording information.

In an embodiment of the present disclosure, the distribution node may further include: a broadcast prohibit command receiving unit and a broadcast prohibit command executing unit (not illustrated in FIG. 4).

The broadcast prohibit command receiving unit may be configured to receive a broadcast prohibit command sent by the storage node.

The broadcast prohibit executing unit may be configured to perform a broadcast prohibit operation based on the broadcast prohibit command received by the broadcast prohibit command receiving unit.

In an embodiment of the present disclosure, the distribution node may further include: a recording end notification unit (not illustrated in FIG. 4), configured to send a recording task end notification message, where the recording task end notification message may include a task identifier.

Figure 5:
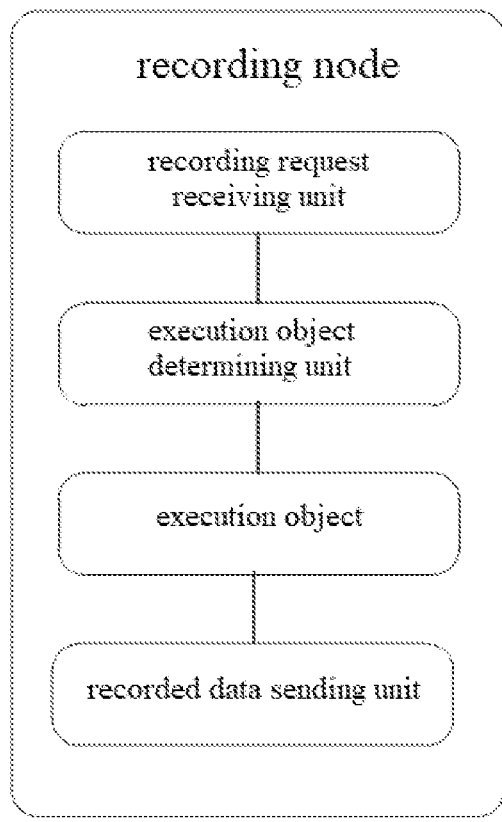
FIG. 5 is a module diagram of a recording node in the system for processing live-broadcasting data according to an embodiment of the present disclosure.

Referring to FIG. 5, the recording node may include: a recording request receiving unit, an execution object determining unit, an execution object and a recording data sending unit.

The recording request receiving unit may be configured to receive a recording request sent by the distribution node.

The execution object determining unit may be configured to determine a recording execution object based on the recording type in the recording information.

The execution object may be configured to pull the live-broadcasting streaming data based on a live-broadcasting streaming data address in the recording information, and record based on a recording mode corresponding to a container format in the recording information.

The recorded data sending unit may be configured to send the recorded file and the corresponding recording information thereof to the storage node.

Where the execution object may include: a pulling subunit, a recording mode determining subunit and a data recording subunit.

The pulling subunit may be configured to pull the live-broadcasting streaming data based on a live-broadcasting streaming data address in the recording information.

The recording mode determining subunit may be configured to determine a recording mode based on a container format in the recording information. The recording mode includes video file recording and picture recording.

The data recording subunit may be configured to record the pulled live-broadcasting streaming data based on the determined recording mode.

Figure 6:
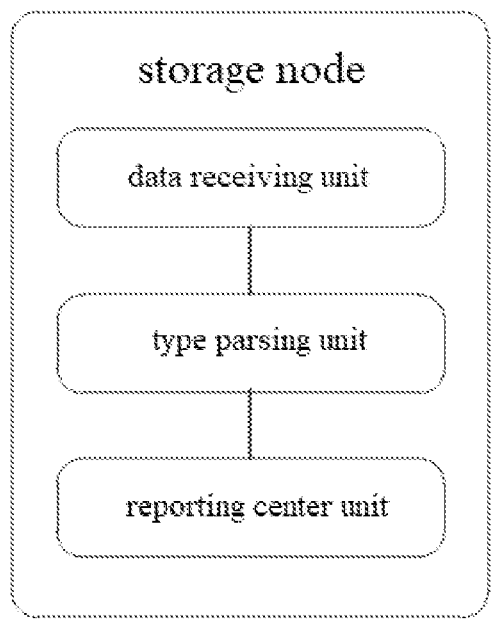
FIG. 6 is a module diagram of a storage node in the system for processing live-broadcasting data according to an embodiment of the present disclosure.

Referring to FIG. 6, the storage node may include: a data receiving unit, a type parsing unit and a reporting center unit.

The data receiving unit may be configured to receive the recording information and the recorded file sent by the recording node.

The type parsing unit may be configured to determine a recording type corresponding to the recorded file based on the recording information.

The reporting center may be configured to generate storage information for the recorded file based on the recording type. The storage information may include: a URL and/or a broadcast prohibit command.

Figure 7:
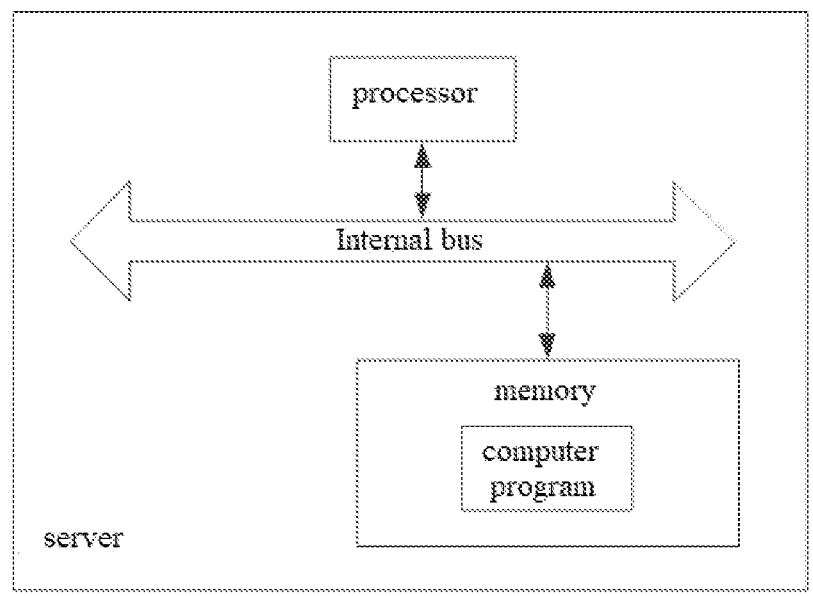
FIG. 7 is a schematic structural diagram of a stream-pushing server according to an embodiment of the present disclosure.

Referring to FIG. 7, the present disclosure further provides a server. The server includes a memory and a processor. The memory is configured to store a computer program, when the computer program is executed by the processor, it may be implemented the above method for processing live-broadcasting data.

Figure 8:
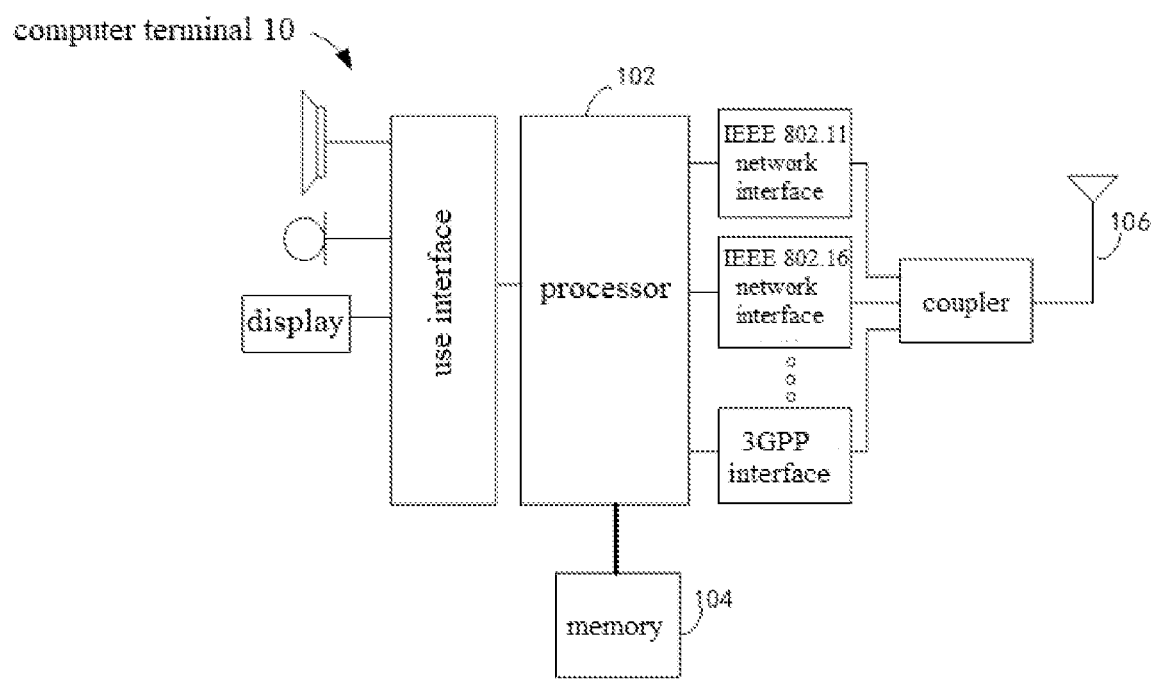
FIG. 8 is a schematic structural diagram of a computer terminal according to an embodiment of the present disclosure.

Referring to FIG. 8, in the present disclosure, the technical solutions according to the above embodiments may be applied to a computer terminal 10 as illustrated in FIG. 10. The computer terminal 10 may include: one or a plurality of (but only one in the drawing) processors 102 (the processors 102 may include, but not limited to, a microcontroller unit MCU, a programmable logic device FPGA or the like processing devices), a memory 104 for storing data, and a transmission module 106 for implementing the communication function. Persons of ordinary skill in the art may understand that the structure as illustrated in FIG. 8 is merely exemplary, which causes no limitation to the structure of the electronic device. For example, the computer terminal 10 may further includes more or fewer components than shown in FIG. 8, or have a different configuration than that shown in FIG. 8.

The memory 104 may be configured to store software programs and modules of application software, and the processor 102 may run the software programs and modules stored in the memory 104 to implement various function applications and data processing. The memory 104 may include a high-speed random memory, and may further include a non-volatile memory, for example, one or a plurality of magnetic storage devices, flash memories, or other non-volatile solid memories. In some embodiments of the present disclosure, the memory 104 may further include memories remotely configured relative to the processor 102. These memories may be connected to the computer terminal 10 via a network. Examples of the above network include, but not limited to, the Internet, an Intranet, a local area network, a mobile communication network and combination thereof.

Specifically, in the present disclosure, the deployment method of the server may be stored in the memory 104 as a computer program. The memory 104 may be coupled to the processor 102. In this way, when the processor 102 runs the computer program stored in the memory 104, various steps in the deployment method of the server may be performed.

The transmission apparatus 106 is configured to receive or send data via a network. Specific examples of the network may include a wireless network provided by a communication service provider of the computer terminal 10. In an embodiment of the present disclosure, the transmission apparatus 106 includes a network interface controller (NIC), which may be connected to other network devices via a base station and hence communicates with the Internet. In an embodiment of the present disclosure, the transmission apparatus 106 may be a radio frequency (RF) module, which is configured to communicate with the Internet in a wireless mode.

It can be seen from the above technical solutions provided by the present disclosure, the live-broadcasting data streams may be differently processed based on different recording types and recording parameters to generate different recorded files. The recording type may include: on-demand replay, highlight collection and content auditing. Therefore, by processing the live-broadcasting data streams based on different recording types and recording parameters, video files or picture files having a predefined time duration are generated for user to replay in an on-demand mode, or highlight segments during the live-broadcasting may also be intercepted to generate a highlight collection for user to watch, and further whether live-broadcasting content is legal or not may be audited. In this way, different demands from different users on replaying the live-broadcasting content may be accommodated. Therefore, with the technical solutions according to the present disclosure, the live-broadcasting streaming media data may be processed in diversified modes to accommodate the demands from different users on replaying or auditing the live-broadcasting content. In this way, user experience is improved.

According to the above embodiments of the present invention, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a storage medium, such as a ROM/RAM, a magnetic disk, a CD-ROM and the like, including several instructions for causing a computer device (a personal computer, a server, or a network device) to perform the various embodiments of the present disclosure, or certain portions of the method of the embodiments.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for processing live-broadcasting data, comprising:
  acquiring live-broadcasting streaming data of streaming media;
  receiving recording information corresponding to the live-broadcasting streaming data, wherein the recording information comprises a recording type and a recording parameter;
  determining a recording execution object based on the recording type in the recording information;
  pulling the live broadcasting streaming data based on a live broadcasting streaming data address in the recording information;
  determining a recording mode based on a container format in the recording information, wherein the recording mode comprises video file recording and picture recording, and the container format has a predefined correspondence with the recording mode;
  recording the pulled live-broadcasting streaming data based on the determined recording mode corresponding to the container format to obtain a recorded file; and generating storage information for the recorded file based on the recording information.

2. The method according to claim 1, wherein the recording type comprises at least one of the following: content auditing, record replay and highlight collection.

3. The method according to claim 1, wherein the recording parameter comprises at least one of the following: a live-broadcasting streaming data address, a report center information, a storage information, a container format, a coding format, a resolution and a segmentation interval duration.

4. The method according to claim 1, wherein the predefined correspondence comprises:
when the container format in the recording information comprises a video file format, the corresponding recording mode comprises the video file recording; or
when the container format in the recording information comprises a picture file format, the corresponding recording mode comprises the picture recording.

5. The method according to claim 1, wherein the storage information comprises: a URL and/or a broadcast prohibit command.

6. The method according to claim 5, wherein when the storage information comprises a broadcast prohibit command, the method further comprises: performing a broadcast prohibit operation for the recorded file based on the broadcast prohibit command.

7. The method according to claim 5, wherein the broadcast prohibit command comprises: broadcast prohibit time.

8. The method according to claim 1, wherein the generating storage information for the recorded file based on the recording information comprises: generating the storage information for the recorded file based on a storage information generation mode corresponding to the recording type in the recording information; wherein the recording type has a predefined correspondence with the storage information generation mode.

9. The method according to claim 8, wherein the generating the storage information for the recorded file based on a storage information generation mode corresponding to the recording type in the recording information comprises:
when the recording type comprises on-demand replay, the generating the storage information comprises: generating a corresponding URL for a recorded on-demand file;
when the recording type comprises highlight collection, the generating the storage information comprises: matching a video frame in the recorded file with a predefined image feature library, and intercepting video data having a predefined preamble duration and a subsequent duration in the video frame and generating a URL for the intercepted video data if the video frame successfully matches with the predefined image feature library; or
when the recording type comprises content auditing, the generating the storage information comprises: extracting a plurality of pictures corresponding to the recorded file, sequentially matching the plurality of pictures with a predefined content auditing feature library, and generating a broadcast prohibit command corresponding to the recorded file if a consecutive value of successful matching reaches a predefined threshold.

10. The method according to claim 9, wherein when the recording type comprises highlight collection and a plurality of video data are intercepted from one recorded file, the generating the storage information further comprises: combining the plurality of video data into one video data, and generating a corresponding URL.

11. A system for processing live-broadcasting data, comprising:
a distribution node, configured to acquire live-broadcasting streaming data of streaming media, and receive recording information corresponding to the live-broadcasting streaming data, wherein the recording information comprises a recording type and a recording parameter;
a recording node, configured to record the live-broadcasting streaming data based on the recording information to result in a recorded file; and
a storage node, configured to generate storage information for the recorded file based on the recording information, wherein the storage information comprises a URL and/or a broadcast prohibit command;
wherein the recording node is further configured to:
receive a recording request sent by the distribution node;
determine a recording execution object based on the recording type in the recording information;
pull the live broadcasting streaming data based on a live broadcasting streaming data address in the recording information, determine a recording mode based on a container format in the recording information, and record the pulled live broadcasting streaming data based on the determined recording mode corresponding to the container format; and
send the recorded file and the corresponding recording information thereof to the storage node,
wherein the recording mode comprises video file recording and picture recording.

12. The system according to claim 11, wherein the distribution node
is further configured to send a recording request to a recording node, wherein the recording request comprises the recording information.

13. The system according to claim 12, wherein the distribution node is further configured to:
receive a broadcast prohibit command generated by the storage node; and
perform a broadcast prohibit operation based on the broadcast prohibit command received by the broadcast prohibit command receiving unit.

14. The system according to claim 12, wherein the distribution node is further configured to send a recording task end notification message; wherein the recording task end notification message comprises a task identifier.

15. The system according to claim 11, wherein the storage node is configured to:
receive the recording information and the recorded file sent by the recording node;
determine a recording type corresponding to the recorded file based on the recording information; and
generate storage information for the recorded file based on the recording information, wherein the storage information comprises a URL and/or a broadcast prohibit command.

16. A server, comprising a memory and a processor; wherein the memory is configured to store a computer program, when the computer program is executed by the processor, the method as defined in claim 1 is performed.

* * * * *